(12) United States Patent
Mellert et al.

(10) Patent No.: US 9,087,651 B2
(45) Date of Patent: Jul. 21, 2015

(54) VIBRATION LIMIT SWITCH SYSTEM

(71) Applicants: Martin Mellert, Steinach (DE); Joern Jacob, Kirnbach (DE); Holger Gruhler, Tuningen (DE)

(72) Inventors: Martin Mellert, Steinach (DE); Joern Jacob, Kirnbach (DE); Holger Gruhler, Tuningen (DE)

(73) Assignee: VEGA GRIESHABER KG, Wolfach (DE)

( * ) Notice: Subject to any disclaimer, the term of this patent is extended or adjusted under 35 U.S.C. 154(b) by 272 days.

(21) Appl. No.: 13/670,793

(22) Filed: Nov. 7, 2012

(65) Prior Publication Data

US 2013/0313084 A1 Nov. 28, 2013

Related U.S. Application Data

(60) Provisional application No. 61/562,023, filed on Nov. 21, 2011.

(30) Foreign Application Priority Data

Nov. 9, 2011 (EP) .................................... 11188443

(51) Int. Cl.
*H01H 3/16* (2006.01)
*G01F 23/296* (2006.01)
*H01H 11/00* (2006.01)

(52) U.S. Cl.
CPC ............ *H01H 3/16* (2013.01); *G01F 23/2967* (2013.01); *H01H 11/00* (2013.01); *Y10T 29/42* (2015.01)

(58) Field of Classification Search
CPC .......... H03H 9/21; H03H 9/09; H04R 17/00; B06B 1/0603; B06B 1/0685; F16F 15/005; G10K 11/002
USPC ................. 310/322, 326, 327, 328, 369, 370
See application file for complete search history.

(56) References Cited

U.S. PATENT DOCUMENTS 5,844,491 A * 12/1998 Getman et al. ................ 340/612
7,893,603 B2 * 2/2011 Lopatin ......................... 310/369

(Continued)

FOREIGN PATENT DOCUMENTS

| CN | 19720519 | 11/1998 |
| CN | 1494650 | 5/2004 |
| DE | 19720519 | 11/1998 |

OTHER PUBLICATIONS

EP Appln. No. 11 188 443.3, Search Report issued Apr. 11, 2012, 4 pages—German, 2 pages—English.
Chinese Patent Appln. No. 2012 1044 9009.1, Office Action dated Sep. 18, 2014, 5 pages—English, 5 pages—Chinese.

*Primary Examiner* — Derek Rosenau
*Assistant Examiner* — Bryan Gordon
(74) *Attorney, Agent, or Firm* — Andrew F. Young, Esq.; Lackenbach Siegel, LLP

(57) ABSTRACT

A vibration limit switch system and related method is provided with a piezoelectric transmitting- and/or receiving unit, in operable connection with a membrane that can be put in oscillation, and a mechanical oscillation arrangement that is coupled to the membrane, whereby the piezoelectric transmitting- and/or receiving unit is adhered directly, or via an adaptation layer by an adhesive layer, to the membrane 4. In this improvement, the adhesive layer between the membrane and the transmitting-and/or receiving unit or the adaptation layer has a thickness in an edge area R which thickness is elevated in comparison to a central area Z. This thickness is arranged in differing geometries and amounts to further improve performance.

26 Claims, 2 Drawing Sheets

(56) References Cited

U.S. PATENT DOCUMENTS

| | | |
|---|---|---|
| 2003/0159506 A1* | 8/2003 | Brutschin et al. ........... 73/290 V |
| 2004/0244481 A1* | 12/2004 | Woehrle ...................... 73/290 V |
| 2005/0034521 A1* | 2/2005 | Lopatin ........................... 73/649 |
| 2006/0290524 A1* | 12/2006 | Pfeiffer ......................... 340/618 |

* cited by examiner

Fig. 1    PRIOR ART
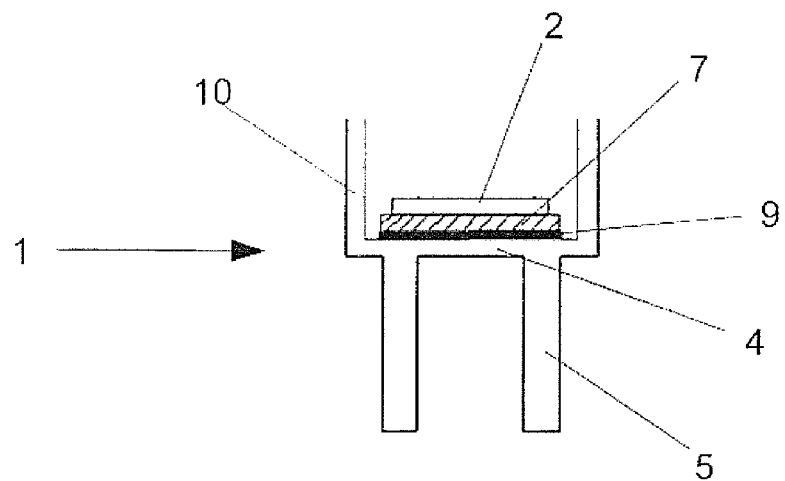
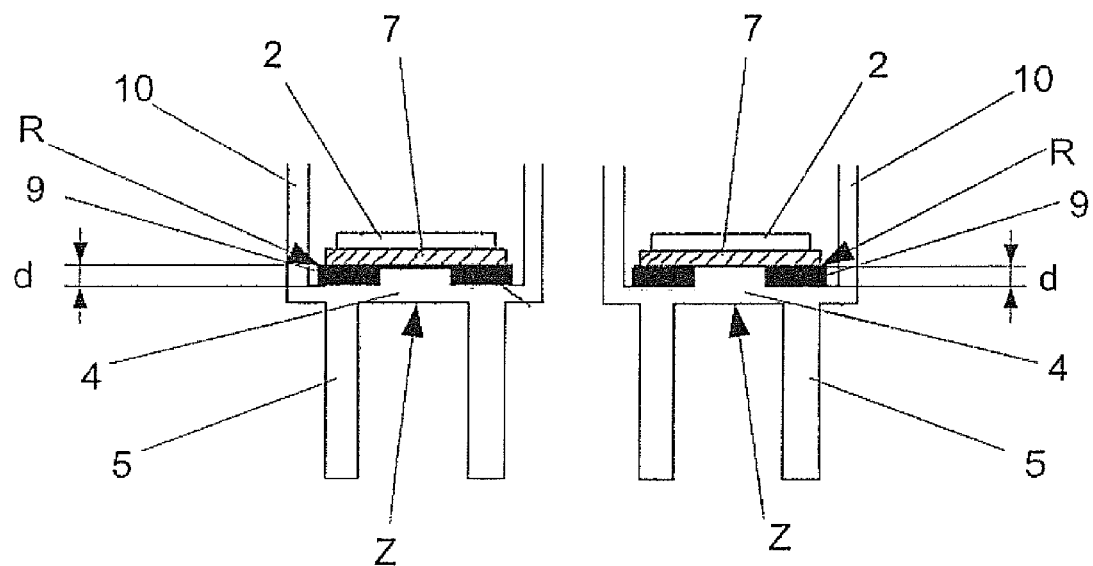
FIG. 2A    FIG. 2B

VIBRATION LIMIT SWITCH SYSTEM

CROSS REFERENCE TO RELATED APPLICATIONS

This application relates to, and claims priority from, EP Ser. No. 11 188 443.3 filed Nov. 9, 2011, and from U.S. Ser. No. 61/562,023 filed Nov. 21, 2011, the entire contents of each of which are fully incorporated herein by reference.

FIGURE SELECTED FOR PUBLICATION

FIG. 2A

BACKGROUND OF THE INVENTION

1. Field of the Invention

The present invention relates to a vibration limit switch system. More particularly, the present invention relates to vibration limit switch system that eliminates thermally and other induced shearing forces.

2. Description of the Related Art

The detection of the limiting status plays an important part in industrial processes, in particular for liquids and bulk materials. In the determination of the limiting status the attaining of a defined filling height is detected and converted into a switching command. The switching command then starts or stops, for example, a filling apparatus so that an overfilling of a container is prevented. A detection of the limiting status can be realized, for example, in liquids, pastes, powders, or coarse bulk materials.

Vibration limit switches like those known from the prior art comprise a piezoelectric transmitting- and/or receiving unit, a membrane that can be put in oscillation and a mechanical oscillation arrangement that is coupled to the membrane, whereby the piezoelectric transmitting- and/or receiving unit is adhered directly or via an adaptation layer by means of an adhesive layer to the membrane. An adhering of the piezoelectric transmitting- and/or receiving unit to the membrane has a distinctly simpler construction in comparison to a coupling via a traction bolt, by means of which the transmitting- and/or receiving unit is tensioned to the membrane, and thus makes possible a more favorable manufacture of the vibration limit switch.

FIG. 1 shows a section through a conventional vibration limit switch 1 known from the prior art. The vibration limit switch shown comprises a housing 10 that is closed on the front side by a membrane 4 which can be put in oscillation. The membrane 4 is as a rule designed to be circular and has a continuously uniform thickness, as is shown in FIG. 1. A mechanical oscillating arrangement 5 is arranged on the front side of the membrane 4 which oscillating arrangement in the present exemplary embodiment is an oscillation fork. The oscillation fork 5 is stimulated to its resonance frequency by oscillations of the membrane 4 and begins to oscillate with this frequency. When the oscillation fork 5 is covered with filling materials physical contact results and the frequency of the oscillation fork 5 necessarily drops, so that the attaining of a limiting status can be detected and converted into a switching signal.

The membrane 4 can be put in oscillation via a piezoelectric transmitting- and/or receiving unit 2 which is arranged inside the housing 10. The piezoelectric transmitting- and/or receiving unit 2, also called piezodrive in the following, is adhered in the present exemplary embodiment to the membrane 4 via an adaptation layer 7. The sole scope of the related art shows that both the adaptation layer 7 as well as the membrane 4 are constructed with level planar surfaces that face one another so that an adhesive layer 9 arranged between the membrane 4 and the adaptation layer 7 has a constant thickness over its entire extent.

The adaptation layer 7 is designed in the present exemplary embodiment as a so-called adaptation ceramic material that should ensure a graduated transition of the thermal coefficient of expansion between the piezodrive 2 and the membrane 4.

The thermal coefficient of expansion of the membrane 4, that typically consists of high-grade steel, is approximately $16 \times 10^{-6} K^{-1}$, whereby the thermal coefficient of expansion of the piezoelectric transmitting- and/or receiving unit Z is typically in the range of $4 \times 10^{-6} K^{-1}$. The difference in the thermal expansion of membrane 4 and piezodrive 2, that differs approximately by a factor of 4, can be adapted to one another by an adaptation layer 7 of material with a thermal coefficient of expansion of approximately $8 \times 10^{-6} K^{-1}$. The piezodrive 2 is adhered, for its part, to the adaptation layer 7 so that the adaptation layer can transfer the mechanical oscillations of the piezodrive 2 onto the membrane 4. In addition, a ceramic adaptation layer 7 ensures an electrical insulation between electrodes provided on the piezodrive 2 that serve to control the piezodrive 2 and between the metallic membrane 4 as well as between the oscillation fork 5 arranged on the latter.

It is well recognized in the vibration limit switches known from the prior art and with the design described above, as a strong disadvantage that tears frequently occur in the adhesive layer 9 in spite of the adaptation layer 7. These tears in the adhesive layer 9 are traced to thermally induced shearing forces that result in a fatigue of the adhesive layer 9 in spite of an adaptation of the thermal coefficient of expansion of the materials used, so that a formation of tears and therewith a defect of the vibration limit switch 1 can not be prevented. To date, no solution to this strong concern has been presented in the related art.

Accordingly, there is a need for an improved vibration limit switch system, that overcomes the strong disadvantages of the prior art and makes available an improved vibration limit switch.

ASPECTS AND SUMMARY OF THE INVENTION

The proposed invention provides a vibration limit switch system with a piezoelectric transmitting- and/or receiving unit, in operable connection with a membrane that can be put in oscillation, and a mechanical oscillation arrangement that is coupled to the membrane, whereby the piezoelectric transmitting- and/or receiving unit is adhered directly, or via an adaptation layer by an adhesive layer, to the membrane 4. In this improvement, the adhesive layer between the membrane and the transmitting-and/or receiving unit or the adaptation layer has a thickness in an edge area R which thickness is elevated in comparison to a central area Z. This thickness is arranged in differing geometries and amounts to further improve performance.

In one alternative embodiment of the present invention, a vibration limit switch system comprises a piezoelectric transmitting- and/or receiving unit, a membrane that can be put in oscillation, and a mechanical oscillation arrangement that is coupled to the membrane, whereby the piezoelectric transmitting- and/or receiving unit is adhered directly or via an adaptation layer by an adhesive layer to the membrane, whereby the adhesive layer between the membrane and the transmitting-and/or receiving unit or the adaptation layer has a thickness in an edge area which thickness is elevated in comparison to a central area.

In the present invention the central area is understood to be an area around the geometric center of gravity of the membrane, the adaptation layer and the piezoelectric transmitting- and/or receiving unit, which are assumed to be level areas. The edge area is understood to be an annular or a frame-shaped area that is arranged circumferentially around the central area and in the area of the outer contour of the previously designated structural elements.

As will be recognized now, following study of the inventive disclosure herein, that changes in length, due to thermal expansion of the membrane, and the thermal expansion of the adaptation layer or of the piezoelectric drive, which is less in comparison to these changes in length, resulted in elevated shearing forces and the formation of tears especially in an edge area of the layers bordering on each other. As result of the fact that in this area an elevated thickness of the adhesive layer is provided, the present invention achieves an adhesive layer in this area that can better absorb the shearing forces being produced, as result of which provides for a reduced formation of tears and a substantial improvement never recognized in the past. As a result of the fact that a reduced thickness of the adhesive layer is provided in the central area, it is furthermore achieved that the oscillations of the transmitting- and/or receiving unit are transferred as lossless as possible onto the membrane.

An adaptation of the present invention provides that a thickness of the adhesive layer is preferably realized in that the membrane has a greater thickness in the central area than in the edge area.

In one optional embodiment of the present invention, the thickness of the membrane preferably increases starting from the edge area toward the central area and in the direction of the piezoelectric transmitting- and/or receiving unit, i.e. so that an area of the membrane that is substantially plane is formed which area faces away from the piezoelectric transmitting- and/or receiving unit and that an increase of the membrane thickness rises exclusively or at least mainly in the direction of the piezoelectric transmitting- and/or receiving unit.

A further alternative and adaptive embodiment of the present invention provides an embodiment wherein the thickness of the membrane increases continuously starting from the edge area. A continuous changing of the thickness of the membrane starting from the edge area has the advantage that no edges or sudden changes of the membrane are embedded in the adhesive layer that could serve as crystallization point for the creation of tears in the adhesive layer and will be recognized as a reduction of a stress concentrator for minimization of tears.

However, the present invention also provides that a membrane thickness may change suddenly. A sudden change of the membrane thickness can be appropriate for reasons of simplification of the manufacturing process. In this manner in particular a plane-parallel alignment of the piezoelectric transmitting- and/or receiving unit and of the membrane is facilitated. To this end the membrane can be designed, for example, in a graduated manner. If a graduated formation of the membrane is used, i.e., if the central area of the membrane is designed as a type of plateau, a plane-parallel alignment can take place an especially simple manner between the plateau area and the piezoelectric transmitting- and/or receiving unit and/or the adaptation layer.

As a further alternative embodiment it will be recognized that a sudden increase in the membrane thickness can be designed to be, for example, graduated in one or more steps.

In the case of a continuous increase of the membrane thickness it can take place in an adhesive area or on the whole substantially in the shape of a truncated cone. The formation of the membrane contour as a truncated cone brings it about that on the one hand a continuous transition takes place between the edge area and the central area and on the other hand a good plane-parallel alignment of the piezoelectric transmitting- and/or receiving unit and/or of the adaption layer and of the membrane can take place in the central area by a plane upper side of the truncated cone.

For a continuous increase of the membrane thickness it can also be constructed, for example, in the form of a cone or of a cup.

It should be emphasized that a plurality of embodiments are possible for a membrane geometry with continuously or suddenly increasing thickness of the membrane and that the previous preferred embodiments are to be understood solely by way of example, however, they exhibit the cited specific advantages.

Adaptive embodiments of the proposed invention are especially advantageous in which a side of the membrane facing the transmitting- and/or receiving unit is designed flat in the central area. As already multiply indicated, a flattened formation of the membrane in the central area can simplify a plane-parallel alignment of the transmitting- and/or receiving unit and of the adaptation layer and the membrane.

It will be further recognized, that in order to achieve a better adhesion strength between the membrane and the adhesive layer, it is advantageous if the membrane surface is roughened during an assembly step of the proposed vibration limit switch system. As a result, it will be recognized that the proposed invention further includes the inventive method of manufacturing an improved vibration limit switch wherein steps are included to provide the elements noted herein in formation of a completed vibration limit switch system.

Further, an especially advantageous and direct transfer of oscillations of the transmitting- and/or receiving unit onto the membrane can be achieved if the transmitting- and/or receiving unit or the adaptation layer in the central area is in direct contact with the membrane.

In particular, the thickness of the adhesive layer can be exactly adjusted in the edge area by a support of the transmitting- and/or receiving unit and/or of the adaptation layer in the central area on the membrane or by defining a defined given distance in the central area.

Alternatively, an adhesive layer with a predetermined thickness can be provided between the memory and the transmitting- and/or receiving unit or the adaptation layer in the central area. In this manner a vibration limit switch with uniform properties can be achieved, whereby a good coupling of the transmitting- and/or receiving unit or of the adaptation layer to the membrane takes place by a total-area adhesion even in the central area.

The predetermined thickness of the adhesive layer can be achieved, for example, by a filler contained in the adhesive layer. If, for example, a filler is selected as glass spherules with a certain diameter and admixed into the adhesive, the diameter of these glass spherules can serve to adjust the distance, whereby the glass spherules then function as spacers in the central area as well as stress concentrators during an operation mode to dissipate stress fractures without requiring a continuous adhesive fracture.

A defined thickness of the adhesive layer can be adjusted in the central area by a defined adhesive viscosity even without mechanical spacers.

In addition, according to a further refinement of the invention, there is provided a vibration limit switch system, comprising: a piezoelectric transmitting and/or receiving unit, a membrane that can be operably put in oscillation and with a mechanical oscillation arrangement that is operably coupled to the membrane, the piezoelectric transmitting and/or receiving unit is adhered to the membrane by one of an adhering means consisting of directly adhering via an adhesive layer and adhering via an adaptation layer, the one adhering means being characterized in that the adhesive layer or the adaptation layer has a thickness in an edge area (R) which is elevated in comparison to a central area (Z).

According to another adaptive embodiment of the present invention, there is provided a vibration limit switch system, wherein: the membrane has a greater thickness (d) in the central area (Z) than in the edge area (R).

According to another adaptive embodiment of the present invention, there is provided a vibration limit switch system, wherein: the thickness (d) of the membrane continuously increases starting from the edge area (R) toward the central area (Z).

According to another adaptive embodiment of the present invention, there is provided a vibration limit switch system, wherein: the thickness (d) of the membrane (4) suddenly increases in a step-wise manner.

According to another adaptive embodiment of the present invention, there is provided a vibration limit switch system, wherein: the membrane is constructed having a graduated manner.

According to another adaptive embodiment of the present invention, there is provided a vibration limit switch system, wherein: the membrane is constructed with the shape of a truncated cone.

According to another adaptive embodiment of the present invention, there is provided a vibration limit switch system, wherein: the membrane is constructed with the shape of a cone.

According to another adaptive embodiment of the present invention, there is provided a vibration limit switch system, wherein: the membrane is constructed with the shape of a cup.

According to another adaptive embodiment of the present invention, there is provided a vibration limit switch system, wherein: a side of the membrane which side faces the transmitting and/or receiving unit is constructed flattened in the central area (Z).

According to another adaptive embodiment of the present invention, there is provided a vibration limit switch system, wherein: the membrane surface is roughened.

According to another adaptive embodiment of the present invention, there is provided a vibration limit switch system, wherein: one of the transmitting and/or receiving unit and the adaptation layer is in direct contact with the membrane in the central area (Z).

According to another adaptive embodiment of the present invention, there is provided a vibration limit switch system, further comprising: an adhesive layer with a predetermined thickness arranged between the membrane one of the transmitting and/or receiving unit and the adaptation layer (7) in the central area (Z).

According to another adaptive embodiment of the present invention, there is provided a vibration limit switch system, wherein: the predetermined thickness is given by a filler contained in the adhesive layer.

According to another adaptive embodiment of the present invention, there is provided a method for assembling a vibration limit switch system, comprising the steps of: providing a piezoelectric transmitting and/or receiving unit, providing a membrane that can be operably put in oscillation and with a mechanical oscillation arrangement that is operably coupled to the membrane, adhering the piezoelectric transmitting and/or receiving unit to the membrane by an adhering step selected from the group of steps comprising: directly adhering via an adhesive layer, and adhering via an adaptation layer, whereby the adhering step including the step of providing one of the adhesive layer and the adaptation with a thickness in an edge area (R) which is elevated in comparison to a central area (Z).

According to another adaptive embodiment of the present invention, there is provided a method for assembling a vibration limit switch system, wherein: the membrane has a greater thickness (d) in the central area (Z) than in the edge area (R).

The above, and other aspects, features and advantages of the present invention will become apparent from the following description read in conduction with the accompanying drawings, in which like reference numerals designate the same elements.

BRIEF DESCRIPTION OF THE DRAWINGS

FIG. 1 depicts a vibration limit switch of the conventional art.

FIG. 2A is an illustrated view of a vibration limit switch system according to the present invention.

FIG. 2B is an illustrated view of another alternative vibration limit switch system according to the present invention.

DETAILED DESCRIPTION OF THE PREFERRED EMBODIMENTS

Figures 2C, 2D:
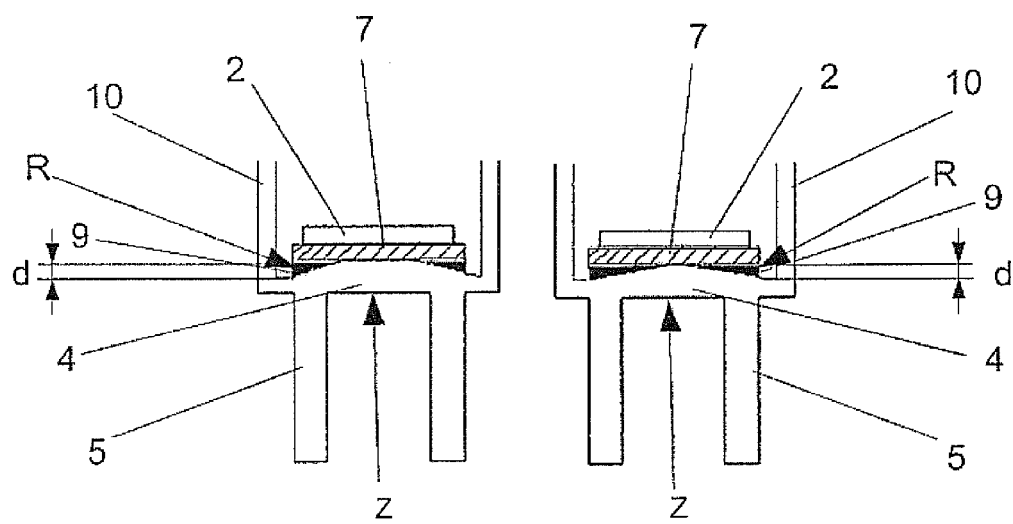
FIG. 2C is an illustrated view of another alternative vibration limit switch system according to the present invention.
FIG. 2D is an illustrated view of another alternative vibration limit switch system according to the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Referring now to FIGS. 2A-2D overall which show four preferred and non-limiting exemplary embodiments of the proposed invention for a vibration limit switch system in accordance with the invention, whereby the basic structure of the vibration limit switch system will be recognized in accordance with the discussions herein and below. It will be understood by those of skill in the art that the proposed invention additionally includes a method for assembling or manufacturing the limit switch system in accordance with assembling the components thereof in an operable manner.

The exemplary embodiments shown differ substantially from the entire scope of conventional art in that a contoured membrane 4 is provided and further that as a consequence a thickness d of the adhesive layer between the membrane 4 and the adaptation layer 7 adhered to it varies, thus there are several adaptive changes that may be modified according to the present disclosure. The piezoelectric transmitting- and/or receiving unit 2 (also called the piezodrive) is arranged on the adaptation layer 7. It will be understood, that the elements of the proposed invention that are different from FIG. 1 may use similar numerical identifiers without having the same structure.

As can be gathered from FIGS. 2A to 2D, the membrane 4 now comprises an adaptively elevated thickness in a central area Z, i.e., in an area around the center or the areal center of gravity of the membrane, which thickness is elevated in comparison to an edge area that is arranged annularly or like a frame around this central area. In the case of a plane-parallel alignment of the piezoelectric transmitting- and/or receiving unit 2 as well as the adaptation layer 7 with an area of the membrane 4 which area faces away from the piezodrive 2, this automatically results in an elevated thickness d of the adhesive layer 9 between the adaptation layer 7 and the membrane 4 in the edge area R.

FIG. 2A shows an exemplary embodiment of a vibration limit switch 1 in which the membrane 4 has a contour in cross section with a central area Z thickened in a graduated manner. As a result, the adhesive layer 9 is constructed significantly thinner in the central area than in the edge area R. It will be recognized that multiple graduated steps may be adaptively and alternatively used.

In the case of a membrane 4 with a circular construction shearing forces acting in the radial direction are received in an improved manner by the adhesive layer 9, that is constructed thicker in the edge area R, so that a distinct production of a formation of tears that is otherwise to be feared is surprisingly achieved.

FIG. 2B shows a membrane 4 with a contour like the one in FIG. 2A, whereby instead the adaptation layer 7 in the central area rests directly on the membrane 4 and an adhesion takes place exclusively in the edge area R running into an annular manner around the central area Z. A plane-parallel alignment between the membrane 4 and the adaptation layer 7 as well as the piezodrive 2 connected to it can be achieved in an especially improved manner by a direct contact of the adaptation layer 7 with the membrane 4 in the central area Z.

FIG. 2C shows an embodiment of the vibration limit switch 1 with the membrane 4 that has a contour in the shape of a truncated cone. As a result of a truncated-cone construction of the membrane 4 the adaptation layer 7, as shown in the FIGS. 2A and 2B, can be arranged either directly or with a defined distance to the covering area of the truncated cone in the central area Z. Starting from the central area Z, the thickness d of the adhesive layer 9 then continuously increases in the direction of the edge area R, whereby a maximal thickness d of the adhesive layer 9 is achieved on the circumference of the adaptation layer 7. It will be recognized that such a truncation may be intermixed with the stepped discussion above as a further adaptive improvement of the present invention.

In the exemplary embodiment shown in FIG. 2D the membrane 4 is constructed with a conical shape. As a result of a conical construction of the membrane 4, similar to the exemplary embodiment shown in FIG. 2C, a continuous increase of the thickness d of the adhesive layer 9 is achieved starting from the central area Z to the edge area R. It will be further understood that an asymmetric variation of thickness may be achieved upon the need to designate an adaptation to a particular vibration mechanical arrangement.

It is pointed out again that the thickness d of the adhesive layer 9 in the central area can either have a distance adjusted by, for example, mechanical spacers or by a defined viscosity of the adhesive, or an adhesion in the central area Z can be eliminated. In particular, a plane-parallel alignment of the piezodrive 2 to the membrane, respectively to its surface facing away from the piezodrive 2, can be achieved by a flattened construction of the contour of the membrane 4 in the central area Z.

LIST OF REFERENCE NUMERALS 1 vibration limit switch
2 piezoelectric transmitting- and/or receiving unit/piezodrive
4 membrane
5 mechanical oscillation arrangement/oscillation fork
7 adaptation layer
9 adhesive layer
Z central area, generally according to the geometry proposed, but not limited thereto
R edge area
D thickness (d)

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

It will be additionally understood that the present invention includes a method for assembly and a method for operation of the proposed invention based upon the disclosure herein and without departing from the scope and spirit of the present invention.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

The invention claimed is:

1. A vibration limit switch system, comprising:
   a piezoelectric transmitting and/or receiving unit;
   a membrane that can be operably put in oscillation and with a mechanical oscillation arrangement that is operably coupled to the membrane;
   the piezoelectric transmitting and/or receiving unit is adhered to the membrane by one of an adhering means consisting of:
      directly adhering by an adhesive layer and adhering by an adhesive layer via an adaptation layer;
   said adhesive layer being characterized in that said adhesive layer has a thickness which is thicker in an edge area (R) than in a central area (Z).

2. A vibration limit switch system, according to claim 1, wherein:
   the membrane has a greater thickness (d) in the central area (Z) than in the edge area (R).

3. A vibration limit switch system, according to claim 2, wherein:
   the thickness (d) of the membrane continuously increases starting from the edge area (R) toward the central area (Z).

4. A vibration limit switch system, according to claim 2, wherein:
   the thickness (d) of the membrane suddenly increases in a step-wise manner.

5. A vibration limit switch system, according to 4, wherein:
   the membrane is constructed having a graduated manner.

6. A vibration limit switch system, according to claim 3, wherein:
   the membrane is constructed with the shape of a truncated cone.

7. A vibration limit switch system, according to claim 2, wherein:
   the membrane is constructed with the shape of a cone.

8. A vibration limit switch system, according to claim 2, wherein:
the membrane is constructed with the shape of a cup.

9. A vibration limit system, according to claim 2, wherein:
a side of the membrane which side faces the transmitting and/or receiving unit is constructed flattened in the central area (Z).

10. A vibration limit system, according to claim 2, wherein:
the membrane surface is roughened.

11. A vibration limit system, according to claim 2, wherein:
one of the transmitting and/or receiving unit and the adaptation layer is in direct contact with the membrane in the central area (Z).

12. A vibration limit system, according to claim 2, further comprising:
an adhesive layer with a predetermined thickness arranged between the membrane one of the transmitting and/or receiving unit and the adaptation layer in the central area (Z).

13. A vibration limit system, according to claim 12, wherein:
the predetermined thickness is given by a filler contained in the adhesive layer.

14. A method, for assembling a vibration limit switch system, comprising the steps of:
providing a piezoelectric transmitting and/or receiving unit;
providing a membrane that can be operably put in oscillation and with a mechanical oscillation arrangement that is operably coupled to the membrane;
adhering the piezoelectric transmitting and/or receiving unit to the membrane by an adhering step selected from the group of steps comprising:
directly adhering avian by an adhesive layer, and
adhering by an adhesive layer via an adaptation layer;
whereby said adhering step including the step of providing said adhesive layer with a thickness which is thicker in an edge area (R) than in to a central area (Z).

15. A method of assembling, according to claim 14, wherein:
the membrane has a greater thickness (d) in the central area (Z) than in the edge area (R).

16. A vibration limit switch system, comprising:
a piezoelectric transmitting and/or receiving unit;
a membrane that can be operably put in oscillation and with a mechanical oscillation arrangement that is operably coupled to the membrane;
the piezoelectric transmitting and/or receiving unit is adhered to the membrane by one of an adhering means consisting of:
directly adhering via an adhesive layer and adhering via an adaptation layer;
said one adhering means being characterized in that the adhesive layer or the adaptation layer has a thickness in an edge area (R) which is thicker than the thickness of the adhesive or adaptation layer in a central area (Z);
wherein the membrane has a greater thickness (d) in the central area (Z) than in the edge area (R); and
wherein one of the transmitting and/or receiving unit and the adaptation layer is in direct contact with the membrane in the central area (Z).

17. A vibration limit switch system, according to claim 16, wherein:
the thickness (d) of the membrane continuously increases starting from the edge area (R) toward the central area (Z).

18. A vibration limit switch system, according to claim 16, wherein:
the thickness (d) of the membrane suddenly increases in a step-wise manner.

19. A vibration limit switch system, according to 18, wherein:
the membrane is constructed having a graduated manner.

20. A vibration limit switch system, according to claim 17, wherein:
the membrane is constructed with the shape of a truncated cone.

21. A vibration limit switch system, according to claim 16, wherein:
the membrane is constructed with the shape of a cone.

22. A vibration limit switch system, according to claim 16, wherein:
the membrane is constructed with the shape of a cup.

23. A vibration limit system, according to claim 16, wherein:
a side of the membrane which side faces the transmitting and/or receiving unit is constructed flattened in the central area (Z).

24. A vibration limit system, according to claim 16, wherein:
the membrane surface is roughened.

25. A vibration limit switch system, comprising:
a piezoelectric transmitting and/or receiving unit;
a membrane that can be operably put in oscillation and with a mechanical oscillation arrangement that is operably coupled to the membrane;
the piezoelectric transmitting and/or receiving unit is adhered to the membrane by one of an adhering means consisting of:
directly adhering via an adhesive layer and adhering via an adaptation layer;
said one adhering means being characterized in that the adhesive layer or the adaptation layer has a thickness in an edge area (R) which is thicker than the thickness of the adhesive or adaptation layer in a central area (Z);
wherein the membrane has a greater thickness (d) in the central area (Z) than in the edge area (R); and
further comprising an adhesive layer with a predetermined thickness arranged between the membrane one of the transmitting and/or receiving unit and the adaptation layer in the central area (Z).

26. A vibration limit switch system, according to claim 25, wherein:
The predetermined thickness is given by a filler contained in the adhesive layer.

* * * * *